Sept. 17, 1968    L. G. KILMER    3,401,771
GAS EXPLODER APPARATUS FOR PROPAGATING SEISMIC WAVES
Filed Feb. 3, 1967    3 Sheets-Sheet 1

INVENTOR
LAUREN G. KILMER
BY McLean, Morton & Boustead
ATTORNEY

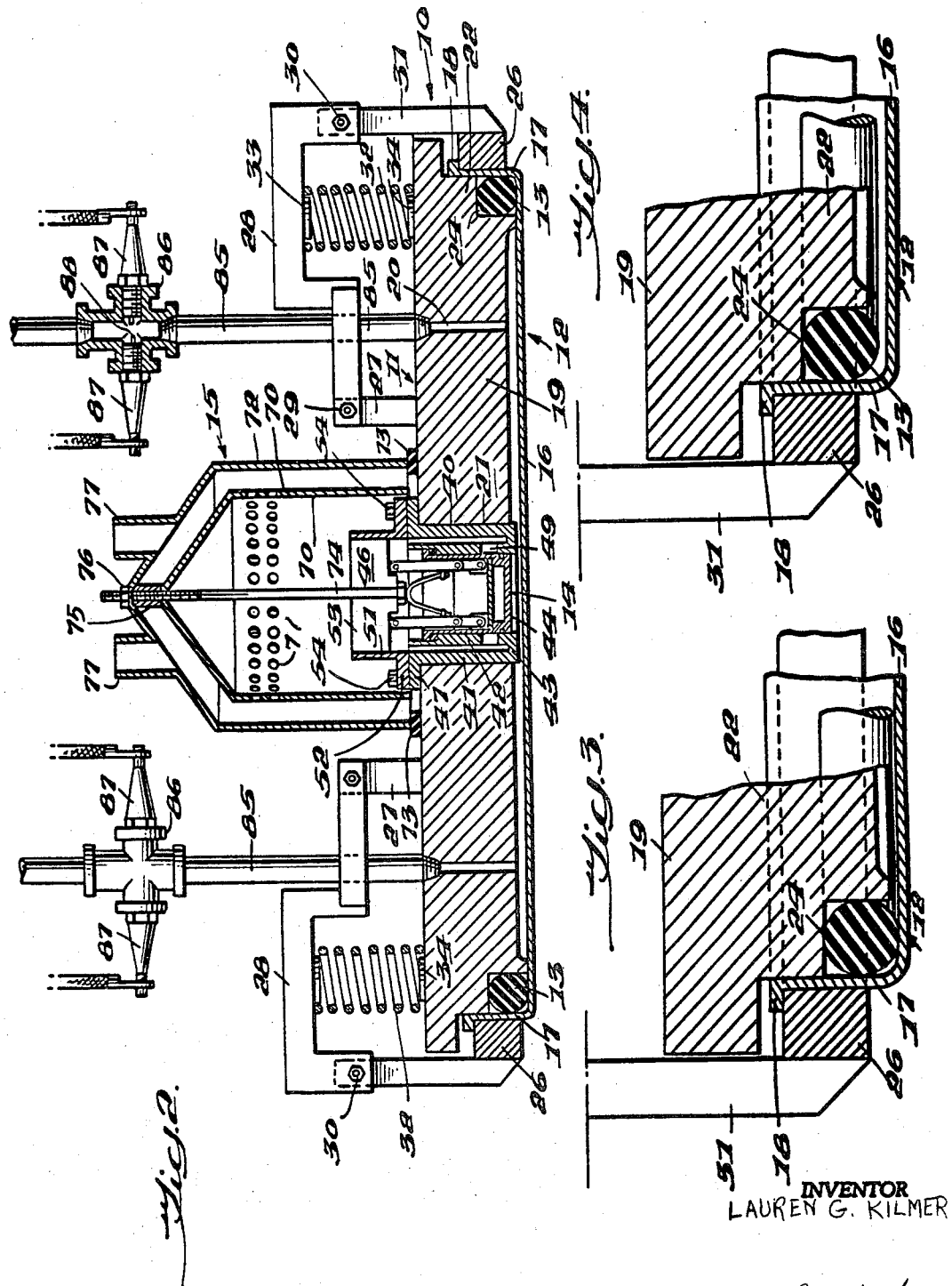

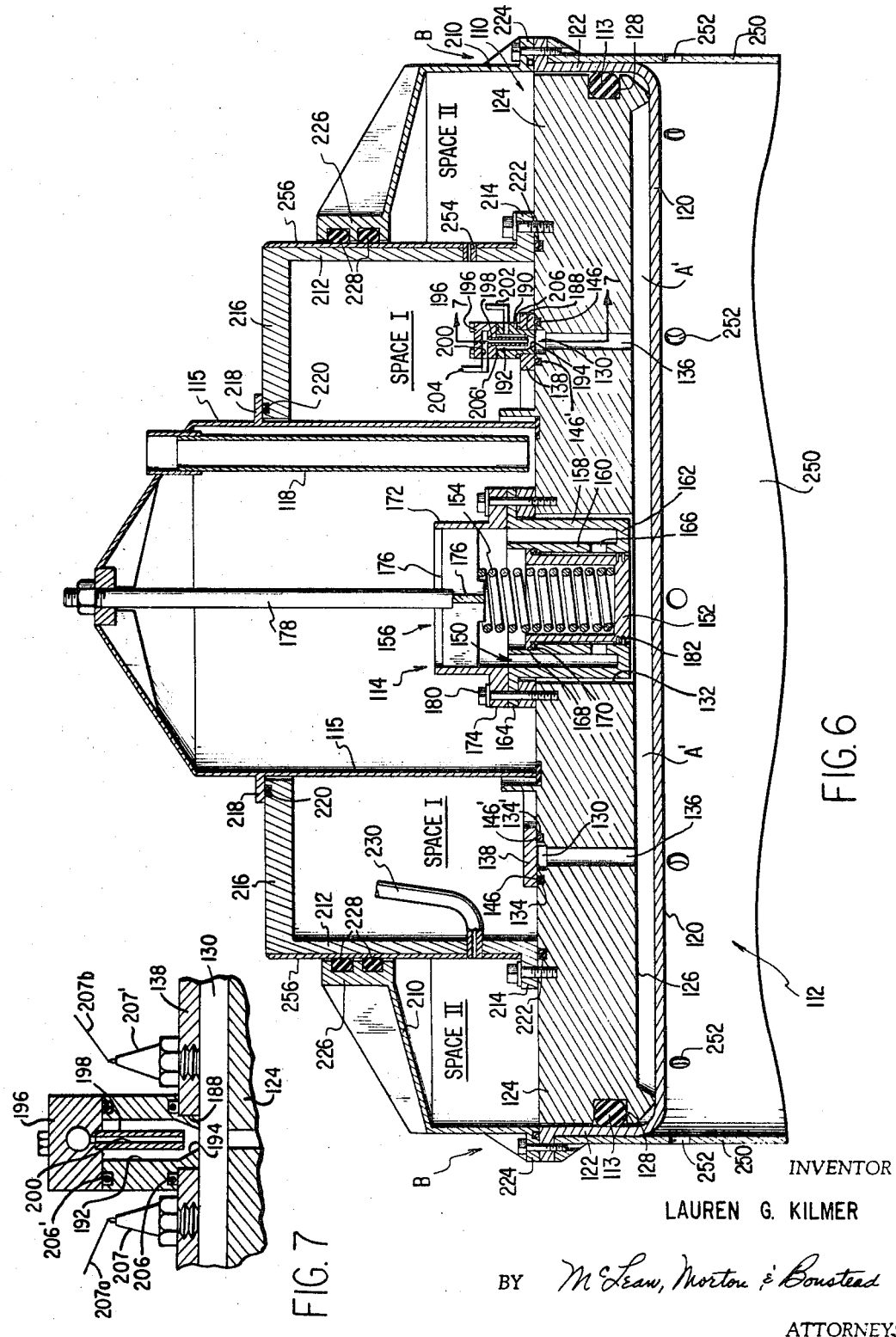

United States Patent Office 3,401,771
Patented Sept. 17, 1968

3,401,771
GAS EXPLODER APPARATUS FOR PROPAGATING SEISMIC WAVES
Lauren G. Kilmer, Tulsa, Okla., assignor to Sinclair Research, Inc., New York, N.Y., a corporation of Delaware
Continuation-in-part of application Ser. No. 544,442, Apr. 22, 1966. This application Feb. 3, 1967, Ser. No. 613,792
11 Claims. (Cl. 181—.5)

ABSTRACT OF THE DISCLOSURE

A seismic prospecting device comprising a gas exploder adapted for underwater use including an expansible explosion chamber having a rigid top and a rigid bottom connected together by an extensible sidewall and resilient fastening means including spring means, e.g. mechanical springs or air cushions, arranged on the top above the chamber for attaching the top and bottom together and for normally biasing the top and bottom together.

---

This invention is a continuation-in-part of copending application Ser. No. 544,442, to Lauren G. Kilmer filed Apr. 22, 1966.

As water-covered areas of the earth have been explored for oil bearing formations, efforts have been made to apply the dry land techniques of seismic surveying and while satisfactory results have been obtained, much has been left to be desired in reducing the cost of an operation which is highly expensive even under favorable conditions. For instance, it is known that a gas explosion confined in an expansible chamber acting at the earth-air interface against a large mass positioned above such gas explosion, can be used to impart a compression wave to the surface of the earth beneath the gas explosion, thereby initiating a seismic wave, see copending application Ser. No. 314,230 to Lauren G. Kilmer, filed Oct. 7, 1963, now U.S. Patent No. 3,314,497, issued Apr. 18, 1967. If the explosion is confined in a device having a rigid top (carrying the weight of the large mass) and rigid bottom with vertical extensible sidewalls, the seismic wave generated is useful for seismic prospecting by refraction and reflection techniques, since the pulse imparted to the earth's surface has a high energy content and can be made of extremely short duration. The size and weight of such devices, the necessary gas feed lines and exhaust systems, however, have heretofore limited their utility in exploring water-covered areas of the earth. Also, the lack of a solid base upon which the device can rest has presented problems. Although it has been attempted to use such devices by supporting them on the bottom of barges or boats, this has generally been unsuccessful due to the large force of the seismic wave produced which adversely affects the boat structure. For these reasons, it has been the usual practice in underwater geophysical exploration to rely upon the well known techniques of generating seismic waves by exploding a quantity of explosive material such, for example, as dynamite and nitro carbo nitrate, contained within a cartridge or casing and fired beneath the water in predetermined spaced relation with respect to the seismic spread.

The use of explosive material, however, possesses several disadvantages, one of which, obviously, is the necessity for replacement of the explosive cartridge after each firing and the problems incident to establishing a firing circuit to each of the cartridges in successive order whenever another cartridge is to be fired. Such an arrangement is costly in operation particularly when a large number of shots are to be fired. Furthermore, when the explosive shot emanates from a point source as is the case with an explosive cartridge, the efficiency of the generated wave is low for the reason that the rate of changes of pressure and the duration of the pressure peak do not correspond to the frequency most favorable to seismic wave propagation. It has been found necessary in the use of these prior devices to employ relatively large quantities of explosives to effect deep penetration of the seismic wave within the subaqueous geological formation by reason of the undesired frequencies and inefficient character of the wave thus produced.

The above problems are, however, overcome by the present invention which provides a gas exploder seismic prospecting device especially designed for underwater geophysical prospecting although, if desired, the device can also be used effectively for land prospecting as well. In general, the gas exploder of this invention comprises a rigid top and a rigid bottom which when at rest are so constructed as to form between them a chamber in which a gas explosion can take place. The top and bottom are joined together by an extensible sidewall such that relative vertical separating movement can take place between them with the chamber remaining closed, to allow an increase in the volume of the chamber. It is apparent the lack of a solid platform for the bottom of the gas exploder to rest on when the device is used underwater can present some difficulty; however, this is overcome by attaching the bottom to the top with a resilient fastening or spring means, such as mechanical springs or air cushions in such a way as to limit the relative vertical separating movement between the top and bottom and to bias the bottom toward the top, i.e. their closed position, so that the volume of the chamber is generally maintained small. Internally of the gas exploder a dynamic seal is provided positioned on the inner side of and adjacent the clearances at the joint between the top and bottom of the gas exploder. Also, in order that the resilient fastening or spring means which biases the top and bottom of the exploder together be not overly strained, a valving arrangement is employed to release the force of the exploded gas simultaneously as relative movement between the top and bottom of the exploder occurs. This is also desirable particularly where several explosions are required at a given location.

For a more complete understanding of the practical application of my invention, reference is made to the appended drawings in which:

FIGURE 2 is a vertical section taken at line 2—2 in FIGURE 1;

FIGURE 3 is an enlarged fragmentary view of a portion of the device as seen in FIGURE 2;

FIGURE 4 is a view similar to FIGURE 3 illustrating the operation of the seal of the present invention;

FIGURE 6 is a vertical section of another embodiment of a gas exploder constructed in accordance with this invention; and FIGURE 7 is an enlarged fragmentary view taken along line 7—7 of FIGURE 6.

Figure 1:
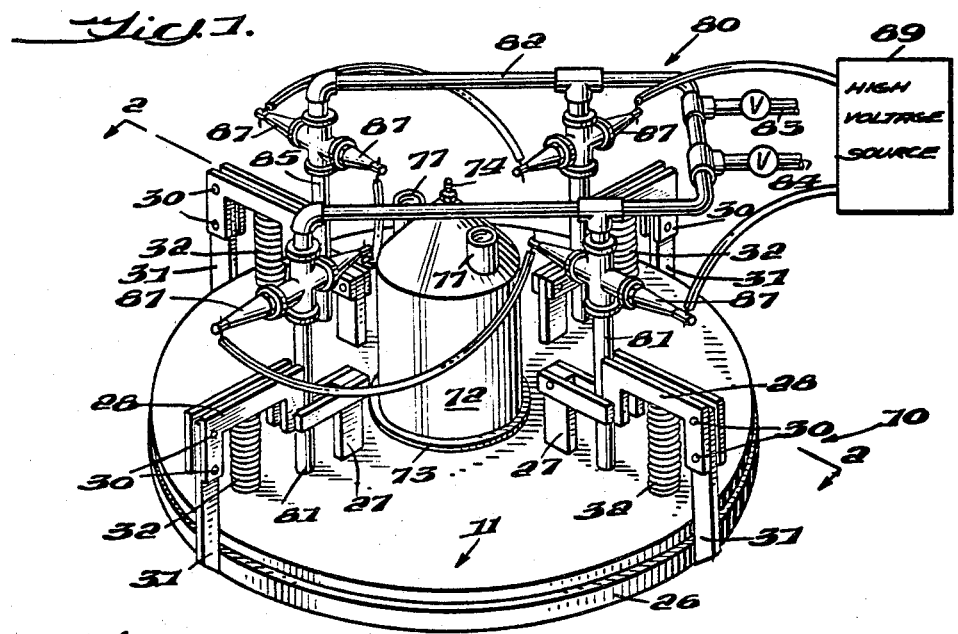
FIGURE 1 is an isometric view of a gas exploder constructed in accordance with my present invention.

Referring more particularly to FIGURES 1 and 2 the reference number 10 designates a gas exploder constructed in accordance with this invention. Gas exploder 10 basically includes a top 11 and a bottom 12 forming an explosion chamber A, a sealing ring 13, a valve 14 and an exhaust stack 15. Bottom 12 includes a circular steel plate 16 which at its rim is provided with an integral, upstanding cylindrical flange 17 which at its upper end carries an integral, outwardly-extending, short, annular flange 18. Top 11 includes an annular, thick-steel plate 19 having an outside diameter slightly larger than the outside diameter of flange 18 and is further provided with four small, tapped, vertical openings 20 disposed at 90° intervals about plate 19 approximately midway between its central opening 21 and its rim. The lower portion 22 of plate 19 is approximately of the same height as flange 17 on bottom plate 16 and has an outside diameter slightly less than that of flange 17 such that top plate 19 can be positioned coaxially over bottom plate 16 with portion 22 inside flange 17 and spaced slightly inward of flange 17. Portion 22 of plate 19 is stepped inwardly at its lower, outer edge to form an annular seal 24 sized to receive O-ring 13. Referring particularly to FIGURE 3 it will be noted that sealing ring 13, which is made of chloroprene rubber, is positioned resting on the top of bottom plate 16 just inside flange 17 such that seat 24 rests on it. Preferably the thickness of ring 13 is sufficient that the bottom of plate 19 slightly clears the top of bottom plate 16 and the sides of ring 13 are just tangent to the side of plate 19 below seat 24 and the inner side of flange 17.

Bottom 12 and top 11 are resiliently fastened together by means of metal hoop 26 positioned encircling flange 17, upstanding members 27 secured to the plate 19 adjacent muffler 15 and cross bars 28 which are pivotally connected at 29 to member 27 and also at 30 to bars 31 which are secured to hoop 26. Hoop 26 has an outer diameter sufficient to extend outwardly of plate 19 so that plate 19 can freely move inside bars 31. Springs 32 are arranged between spring supports 33 and 34 attached, respectively, to bars 28 and top plate 19 to provide resiliency and to bias bottom 12 against top 11. Springs 32 are sized to prevent plate 19 from coming out of bottom 12 and to cushion movement between bottom 12 and top 11 when an explosion occurs in the chamber A.

Valve 14 includes valve body 40, piston (valve element) 44, spring 45 and spring retainer means 46. Generally valve body 40 includes a pair of coaxial cylindrical walls 41 and 42, which are spaced from each other, are closed together at their lower ends by means of an interconnecting annular end wall 43 and are open at their upper ends. The outer sidewall 41 at its upper end is provided with an outwardly extending angular flange 47 and itself has a diameter just less than that of opening 21 such that valve body 40 can be positioned in opening 21 with flange 47 overlying the top of plate 19. Inner wall 42 has a machined inside surface which is counter-sunk at its upper end to provide a seat 48 and is provided with a series of apertures 49 adjacent its lower end providing communication between the annular space between walls 41 and 42 and the central opening of valve body 40 lying inside wall 42.

Piston 44 is a machined casting sized to fit snugly but slidingly within cylindrical wall 42 and has a flange 50 at its upper end received in the seat 48 to limit downward movement of piston 44 to a position in which the lower, closed end of piston 44 is flush with the underside of plate 19 when piston 44 is dropped into the central opening of valve body 40 from its upper ends.

Spring retainer means 46 includes a short steel cylinder 51 which has an outwardly projecting, annular flange 52 at its lower end and a pair of intersecting steel crossplates in its upper interior portion forming a spider 53. The cylindrical portion 51 has the same inside diameter as sidewall 41 of valve body 40 and is positioned above valve body 40 with annular flange 52 overlying flange 47. Cylinder 51 is retained in such position by a series of cap bolts 54 received in apertures in flanges 47 and 52 which register with correspondingly disposed tapped bores about opening 21 in plate 19. The spring 45 is a leaf type spring secured by elements 55 to two knuckle joints each formed by two links 56 and 57 pivotally connected together at 58. Links 56 are pivotally connected at 59 to a plate 60 held against or secured to spider 53. Links 57 are pivotally connected at 61 to a plate 62 which rests on a seat 63 machined in piston 44. Spring 45 normally biases each knuckle joint outwardly and tends to straighten the joints. A sleeve 64 is arranged on plate 62 to prevent the joints from completely straightening out.

Figure 5:
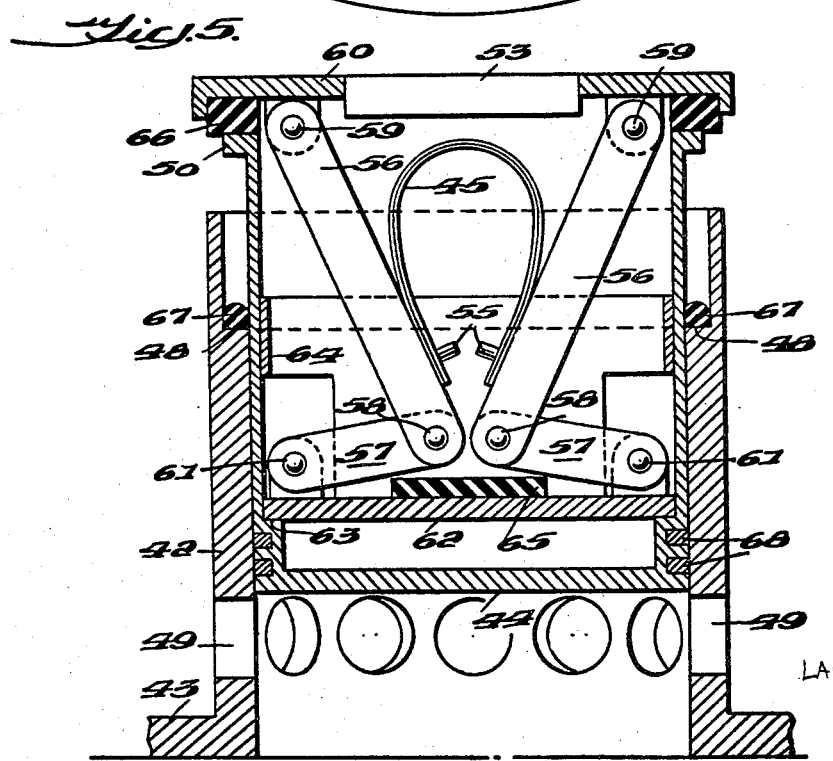
FIGURE 5 is a view similar to FIGURE 3 illustrating the operation of the valve of the present invention.

FIGURE 5 illustrates the open position of the valve to demonstrate operation thereof. In this position the valve piston 44 is raised against the pressure of spring 45 to open apertures 49 which are in communication with the space between top 11 and bottom 12 of the exploder. As the knuckle joint links 57 are raised, the joints 58 are bent inwardly and leaf spring 45 is bowed. Spring 45 in its bowed position applies a force which tends to straighten out the knuckle joints and push downwardly on plate 62 and piston 44. Since sleeve 64 prevents the knuckle joints from straightening out, they are always bowed slightly inwardly assuring operation of the valve. Resilient pad 65 on plate 62 cushions the knuckle joints when they are bent during opening of valve 14. A resilient ring 66 is also attached to plate 60 for cushioning flange 50 during opening of valve 14 and an O-ring 67 is arranged in seat 48 for cushioning flange 50 during closing of valve 14 positions. Piston rings 68 seal the lower end of piston 44.

Muffler 15 includes an open-ended cylinder 70 which at its open, lower end is fitted over the upper end of cylinder 51 and flange 52 and which is provided with lateral openings 71 about its upper, closed end to permit venting of gasses passing upwardly through valve 14 into a second hollow open-ended cylinder 72 which fits over cylinder 70 and rests on a rubber or other resilient sealing strip 73 on top 11, i.e., plate 19, of the chamber. The cylinders 70 and 72 are held in place by bolt 74 which is secured to spider 53. A spacer sleeve 75 holds cylinder 70 in position and nut 76 tightens cylinder 72 against strip 73. Cylinders 70 and 72 can be permanently attached to spacer 75. Two pipe connectors 77 are attached to the upper portion of cylinder 72 and provide for attachment thereto of pipes which extend to the surface of the water when the exploder is used underwater. In operation, the cylinders 70 and 72 act as a plenum chamber so that combustion gases from the exploder 10 may slowly exhaust to the atmosphere between explosions.

Referring to FIGURES 1 and 2 gas exploder 10 further requires a gas charging and ignition system generally designated by the reference number 80. Charging and ignition system 80 basically includes four upstanding conduits 81 interconnected at their upper ends through a header 82 to separate valved connections 83 and 84 leading to storage cylinders respectively for propylene, or other suitable combustible gas, and for oxygen. Each upstanding conduit 81 includes a pipe section 85 threadedly received at its lower end in a tapped aperture 20 in plate 19 and, threadedly received on the upper end of such pipe section 81, a four-way fitting 86. Header 82 generally includes suitable nipples, elbows and T's as well as pipe sections to provide a U-shaped connection communicating the upper openings of four-way fittings 86 with valved conduits 83 and 84 which are preferably connected to the bottom of the U. Eight spark plugs 87 are connected, two to each four-way fitting 86, in the lateral openings or fittings 86 such that, as shown most clearly in FIGURE 2, the insulated electrodes 88 of each thusly associated pair of plugs 87 face each other in such fitting 86. Exteriorly eight spark plugs 87, thus mounted, are electrically connected in series across a suitable electrical supply 89 which is capable of impressing a high voltage, typically on the order of 70,000 volts, across serially interconnected spark plugs 87 at any desired instant in time.

In operation gas exploder 10 is located at a suitable location with bottom 12 resting beneath the surface of a body of water at a desired depth, e.g. up to 50 or more feet, with pipes connected from pipe connectors 77 to the surface of the water. Typically the force of spring 45 is sufficient such that operation of piston 44 does not occur until a pressure within exploder 10 on the order of 30 p.s.i.g. has been reached. Valved conduits 83 and 84 are then opened to admit propylene and oxygen until a pressure in exploder 10 on the order of 2 p.s.i.g. has been achieved. (It will be apparent that a stoichiometric mixture of oxygen and propylene are sought and that this is achieved quite simply by introducing the gases such that the partial pressures of each are in proportion to the molar ratio of a stoichiometric mixture, i.e., $$4.5:1::O_2:C_3H_6)$$

With valved conduits 83 and 84 closed, exploder 10 is properly charged and an explosion can be initiated simply by actuating high voltage source 89 at the desired point in time, whereupon high potential is placed across the serial connection of the eight spark plugs 87. It will be apparent that in the event of any fouling of spark plugs 87 at least two active gaps from an electrode 88 to ground or another electrode 88 are nevertheless provided such that detonation of the mixture of gases within exploder 10 is initiated with a resultant explosion occurring substantially simultaneously with energization of plugs 87.

Noting FIGURE 3, which shows a section through seal 13 and the surrounding structure of gas exploder 10, when exploder 10 is charged the cross-section of sealing ring 13 is of substantially circular shape and the surfaces of flange 17, of plate 16 and of lower portion 22 of plate 19 are tangent to the exterior of ring 13. Upon explosion of the gases, the initial force of the explosion is directed against bottom 12 due to the larger mass of top 11 to create the seismic wave of interest. The continued expansion of the exploding gases drives the bottom 12 downwardly relative to top 11 since bottom 12 is relatively considerably lighter than top 11 tending to compress resilient spring 32, which can so yield, although in a limited manner, as described above. At such time the pressure of the exploding gases forces sealing ring 13 tightly against the joint formed between the flange 17 and portion 22, as indicated in FIGURE 4, generally deforming ring 13 against such joint.

At the same time as relative movement of the bottom 12 and top 11 occurs, however, piston 44 is lifted at even faster rate to vent the interior of gas exploder 10 through valve 14 and muffler 15, see FIGURE 5. This vent action is so rapid that normally the pressure is relieved within a fraction of a second. Generally after such collapse, which collapse is cushioned by sealing ring 13, the pressure of unvented combustion gases remaining between top 11 and bottom 12 is substantially negative to atmospheric, being on the order of five p.s.i.a. As a result, it is usually unnecessary in subsequent firing to purge the interior of gas exploder 10 when recharging, and recharging is so fast that repetitive firing at significantly rapid rates is feasible. After an explosion top 11 and bottom 12 are biased toward their closed position by springs 32 as well as the forces applied by hydrostatic pressure. Springs 32 also prevent bottom 12 from falling off the unit 10 during use of the exploder underwater. Closure of valve 14 through the action of toggles is timed to provide for exhaust of chamber A.

FIGURE 6 illustrates another, and preferred, embodiment of the exploder in accordance with this invention which also basically includes a top 110, a bottom 112, a sealing ring 113, a valve 114 and an exhaust stack 115. Top 110 includes an annular, thick-steel plate 124 having an outside diameter slightly smaller than the inside diameter of the flange 122 on bottom 112 and is further provided with a depressed portion 126 in the bottom thereof as well as a groove 128 in the side thereof which contains sealing ring 113. The depressed portion 126 of plate 124 cooperates with bottom plate 120 of bottom 112 to form the chamber A' of the exploder. Plate 124 also has an annular groove 130 in its upper surface between its outer rim and a central opening 132. Two smaller annular grooves 134 and 134' can be arranged, if desired, in plate 124 on opposite sides of groove 130, see FIGURE 6, for O-rings 146 and 146', respectively, which seal groove 130. Groove 130 is connected to the chamber A' by two small, vertical openings 136 disposed at 180° relative to each other about central opening 132. Plate 124 carries a coaxially positioned, generally annular upper ring 138 which is attached to the top side of plate 124 and covers groove 130 to form therewith an annular passage.

Valve 114 includes a valve body 150, a piston (valve element) 152, a helical spring 154 and a spring retainer cage 156. Generally valve body 150 includes a pair of coaxial cylindrical walls 158 and 160, which are spaced from each other, are closed together at their lower ends by means of an interconnecting annular end wall 162 and are open at their upper ends. The outer sidewall 158 at its upper end is provided with an outwardly extending annular flange 164 and itself has a diameter just less than that of opening 132 such that valve body 150 can be positioned in opening 132 with flange 164 overlying the top of plate 124. Inner wall 160 has a machined inside surface which is counter-sunk at its upper end and which is provided with a series of apertures 166 adjacent its lower end providing communication between the annular space between walls 158 and 160 and the central opening of valve body 150 lying inside wall 160. Piston 152 which is a machined casting sized to fit snugly but slidingly within cylindrical wall 160 has a flange 168 at its upper end received in the counter bore in the upper end of the interior of wall 160 to limit downward movement of piston 152 at a position in which the lower, closed end seals openings 166 in wall 160. An O-ring 170 cushions flange 168 at the counter bore surface. Piston rings 182 seal the piston 152 at its lower end.

Spring cage 156 is a short steel cylinder 172 which has a pair of intersecting steel cross-plates 176 in its upper interior portion forming a spider to which is secured a depending cylindrical rod element 178. The cylinder portion 172 of spring cage 156 is positioned above valve body 150 with flange 174 overlying flange 164 and spring cage 156 and valve body 150 are retained in such position by a series of cap bolts 180 received in apertures in flanges 164 and 174 which register with correspondingly disposed tapped bores arranged about opening 132 in plate 124 such that helical spring 154 is retained snugly under compression between the underside of spider 176 and the upperside of the closed bottom of piston 152. The spacing of the flights of spring 154 in this position and the length of piston 152 in relation to the location of spider 176 is such that when piston 152 is displaced upwardly to the maximum compression of spring 154, apertures 166 in sidewall are completely exposed to connect the chamber A' with the annular space between walls 158 and 160 of valve body 150 and hence with the exterior of the exploder through spring cage 156 and exhaust pipe 118. Pipe 118 can be connected through muffler 115 to provide low-pass characteristics desirably having an upper cut-off frequency on the order of five cycles per second.

The gas charging system, shown in detail in FIGURE 7, basically includes a mixing valve interconnected to groove 130. The mixing valve comprises a member 190 inserted into aperture 188 in ring 138. Member 190 has a central passage 192 and a tapered conical opening 194 which faces groove 130. A top valve member 196 carries a depending tube 198 which is inserted into passage 192 and opening 194 where the spacing of the passage through opening 192 is controlled by the location of tube 198. A passage 200 extends through tube 198 and member 196. Separate valved connections 202 and 204, leading to storage cylinders (not shown) respectively for propylene, or other suitable combustible gas, and oxygen are connected, respectively, to passages 192 and 200. Two O-rings 206 and 206' seal member 190 to ring 138 and member 196 respectively. The ignition system includes two spark plugs 207 and 207' arranged in apertures in ring 138 on either side of the mixing valve to extend through ring 138 and communicate with groove 130. Exteriorly the spark plugs thus mounted are electrically connected via lines 207a and 207b to a suitable electrical supply (not shown) as in FIGURE 1.

Skirt 250 is attached to bottom plate 120 at the outer rim thereof, e.g. through the use of the bolts connecting member 210 to flange 122. In the absence of skirt 250, an explosion in chamber A' can tend to bow bottom plate 120 upward in the middle thereof. It is theorized that, due to the absence of a support beneath the same in water and the incompressibility of water, the water escapes from beneath bottom plate 120 faster at the edges than at the middle. Bowing of plate 120 can interfere with the operation of the device by closing passages 136 and/ or valve 114. Air holes 252 are provided in skirt 250 to allow air to escape upon submersion of the device. It is noted the bottom edge of skirt 250 has a wavey configuration which assists in preventing cavitation of the bottom 120.

An air cushion, generally designated as B, formed between upwardly extending members 210 and 212 resiliently fastens bottom 112 to top 110. Member 212 is bolted to top member 124 at flange 214 and includes an upper flange 216 which engages flange 218 on muffler 115. Flange 216 is sealed at flange 218 by O-ring 220 and flange 214 is sealed at top member 124 by O-ring 222 to form between member 212 and muffler 115 an air space I. Member 210 is bolted at flange 224 to the flange 122 of bottom 112. Member 210 extends upwardly and inwardly toward member 212 to slidedly engage member 212. Member 210 engages member 212 at an enlarged portion 226 and is sealed thereat by O-ring 228 to form an air space II. Member 212 can be sheathed in a metal 256, e.g. Monel metal, for protection against sea water, if desired. Space II is normally filled with air under pressure, e.g. about 15 to 20 p.s.i.g. by means of a hose 230 which extends through the flange 216 (not shown). The air pressure in space II bleeds through bleed valve 254 at a reduced rate from space II into space I which, accordingly, serves as a plenum chamber for the air filled spring. Space I is used to house the various hose connections 202 and 204 for the gas charging system, the mixing valve, the ignition spark plugs 207 and 207', hose 230, etc. and the pressure in space I serves to keep water out.

In operation, as gas in chamber A' is detonated as described above with reference to FIGURE 1, bottom 112 is driven downward relative to top 110 so that member 210 and member 212 slide with respect to each other decreasing the volume of space II and compressing the air within space II. When exhaust valve 114 relieves the pressure produced in chamber A' upon combustion of the gases pulls the top and bottom together leading the chamber A' to its original volume.

It is claimed:
1. Apparatus for propagating a seismic wave including means defining a closed chamber having a rigid bottom and rigid top including at least a portion telescoping into said bottom and forming a joint between said top and bottom at their sides having clearances therebetween; a resilient sealing ring disposed between said top and bottom on the inner side of said joint positioned against the clearances thereof to seal said chamber; a first annular member secured to said bottom outwardly of the top and extending above the top; a second annular member secured to and extending above said top, said first and second annular members being arranged to slidingly and sealingly engage each other above said top and to form therebetween an air cushion; means for supplying air under pressure to said air cushion; gas charging means including conduit means providing external communication to said chamber adapted to provide a combustible mixture in said chamber; ignition means for the combustible mixture; and exhaust means including means defining an opening in said top adapted to provide external communication from the atmosphere to said chamber and normally closed valve means positioned in said opening to close said communication therethrough and operable upon a predetermined increase in pressure in said chamber to open thereby communicating said chamber with the exterior of said device.

2. Apparatus according to claim 1 wherein said gas charging means includes conduit means positioned above said top having a plurality of connections thereto to provide external communication to said chamber at a plurality of spaced points, and said ignition means includes insulated electrode pairs, positioned in said conduit means to define a plurality of spark gaps therein, and means interconnecting said electrodes whereby said spark gaps are electrically connected in series.

3. Apparatus according to claim 1 adapted to propagate a seismic wave beneath the surface of a body of water wherein said exhaust means includes muffler means sealingly secured to said top over said opening and conduit means providing communication between said muffler and the atmosphere.

4. Apparatus as defined in claim 1 wherein said exhaust means includes muffler means sealingly secured to said top over said opening and wherein said second annular member includes a flange engaging said muffler means to form therewith an air space, bleed valve means interconnecting said air cushion and the air space, said gas charging means and ignition means being arranged at least in part in said air space.

5. Apparatus as defined in claim 4 wherein said gas charging means includes a mixing valve arranged in said air space and in the conduit means providing external communication to said chamber and said ignition means includes spark plug means operatively arranged in the conduit means downstream of said mixing valve for igniting the gas mixture in said conduit means and said chamber.

6. Apparatus as defined in claim 5 wherein said valve means is a spring biased piston valve.

7. Apparatus as defined in claim 1 adapted for use underwater including a skirt attached to said bottom and extending downwardly therefrom and holes in said skirt at said bottom to release trapped air from the skirt as the apparatus is submerged.

8. Apparatus as defined in claim 7, wherein the bottom edge of the skirt has a wavy configuration.

9. Apparatus for propagating a seismic wave including means defining a closed chamber having a rigid bottom and rigid top including at least a portion telescoping into said bottom and forming a joint between said top and bottom at their sides having clearances therebetween; a resilient sealing ring disposed between said top and bottom on the inner side of said joint positioned against the clearances thereof to seal said chamber; resilient fastening means for attaching said bottom to said top and permitting vertical movement between said bottom and said top including spring means on said top for limiting said movement, said spring means normally biasing said top and bottom together; gas charging means providing external communication to said chamber adapted to provide a combustible mixture in said chamber and including a first conduit formed by a groove in the top surface of said top and plate means secured to said top above said groove, at least one second conduit connecting said first conduit to said chamber and means for supplying a mixture of fuel gas and oxygen-containing gas to said first conduit including a mixing valve attached to said plate means and means for interconnecting said mixing valve to a source of fuel gas and a source of oxygen-containing gas; spark plug means operatively arranged on both sides of the mixing valve to ignite the gas mixture in said first conduit; and exhaust means including means defining an opening in said top adapted to provide external communication from the atmosphere to said chamber and normally closed valve means in said opening to close said communication therethrough and operable upon a predetermined increase in pressure in said chamber to open thereby communicating said chamber with the exterior of said device.

10. Apparatus for progating a seismic wave underwater including means defining a closed chamber having a rigid bottom and rigid top including at least a portion telescoping into said bottom and forming a joint between said top and bottom at their sides having clearances therebetween; a resilient sealing ring disposed between said top and bottom on the inner side of said joint positioned against the clearances thereof to seal said chamber; resilient fastening means for attaching said bottom to said top and permitting vertical movement between said bottom and said top including spring means on said top for limiting said movement, said spring means normally biasing said top and bottom together; gas charging means including conduit means providing external communication to said chamber adapted to provide a combustible mixture in said chamber; ignition means for the combustible mixture; exhaust means including means defining an opening in said top adapted to provide external communication from the atmosphere to said chamber and normally closed valve means positioned in said opening to close said communication therethrough and operable upon a predetermined increase in pressure in said chamber to open thereby communicating said chamber with the exterior of said device; and a skirt attached to said bottom and extending downwardly therefrom and holes in said skirt at said bottom to release trapped air from the skirt as the apparatus is submerged.

11. Apparatus as defined in claim 10, wherein the bottom edge of the skirt has a wavy configuration.

References Cited

UNITED STATES PATENTS

| | | |
|---|---|---|
| 3,056,104 | 9/1962 | De Kanski et al. |
| 3,099,813 | 7/1963 | Anderson. |
| 3,198,282 | 8/1965 | Dunaway. |
| 3,205,971 | 9/1965 | Clynch. |
| 3,256,501 | 6/1966 | Smith. |
| 3,260,327 | 7/1966 | McCollum. |

BENJAMIN A. BORCHELT, *Primary Examiner.*

G. H. GLANZMAN, *Assistant Examiner.*